US009836316B2

(12) United States Patent
Wang et al.

(10) Patent No.: US 9,836,316 B2
(45) Date of Patent: Dec. 5, 2017

(54) FLEXIBLE ACCELERATION OF CODE EXECUTION

(71) Applicant: Intel Corporation, Santa Clara, CA (US)

(72) Inventors: Cheng Wang, San Ramon, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 13/631,408

(22) Filed: Sep. 28, 2012

(65) Prior Publication Data
US 2014/0096132 A1 Apr. 3, 2014

(51) Int. Cl.
G06F 9/455 (2006.01)
G06F 9/45 (2006.01)
G06F 9/00 (2006.01)

(52) U.S. Cl.
CPC .............. G06F 9/4552 (2013.01); G06F 8/44 (2013.01); G06F 9/45533 (2013.01); G06F 9/45516 (2013.01); G06F 9/45554 (2013.01); Y02B 60/146 (2013.01)

(58) Field of Classification Search
CPC ...... G06F 8/4334; G06F 9/30087; G06F 8/44; G06F 9/45516
USPC ...................... 707/610; 709/1, 223; 712/209; 717/118, 136, 139, 148; 718/1
See application file for complete search history.

(56) References Cited

U.S. PATENT DOCUMENTS

| 6,606,743 | B1 * | 8/2003 | Raz et al. ...................... 717/148 |
| 6,799,195 | B1 * | 9/2004 | Thibault .......... G05B 19/41835 700/4 |
| 7,124,283 | B2 * | 10/2006 | Yamada et al. ............... 712/209 |
| 7,146,613 | B2 * | 12/2006 | Chauvel et al. .................. 718/1 |
| 7,467,381 | B2 * | 12/2008 | Madukkarumukumana et al. ................................. 718/1 |
| 7,631,309 | B2 * | 12/2009 | Wilt et al. ...................... 718/104 |

(Continued)

FOREIGN PATENT DOCUMENTS

| JP | 2004234420 A | 8/2004 |
| JP | 2005534114 A | 11/2005 |
| JP | 2006127183 A | 5/2006 |

OTHER PUBLICATIONS

Bertin, C. et al. "Compilation and virtualization in the HiPEAC vision". Jun. 2010. Proceedings of the 47th Design Automation Conference. ACM, 2010. pp. 96-101.*

(Continued)

Primary Examiner — Lewis A Bullock, Jr.
Assistant Examiner — Gilles Kepnang
(74) Attorney, Agent, or Firm — Barnes & Thornburg LLP

(57) ABSTRACT

Technologies for performing flexible code acceleration on a computing device includes initializing an accelerator virtual device on the computing device. The computing device allocates memory-mapped input and output (I/O) for the accelerator virtual device and also allocates an accelerator virtual device context for a code to be accelerated. The computing device accesses a bytecode of the code to be accelerated and determines whether the bytecode is an operating system-dependent bytecode. If not, the computing device performs hardware acceleration of the bytecode via the memory-mapped I/O using an internal binary translation module. However, if the bytecode is operating system-dependent, the computing device performs software acceleration of the bytecode.

25 Claims, 3 Drawing Sheets

(56) References Cited

U.S. PATENT DOCUMENTS

| | | | |
|---|---|---|---|
| 7,954,094 B2* | 5/2011 | Cascaval ............ | G06F 9/45516 717/140 |
| 8,230,407 B2* | 7/2012 | Song et al. ................... | 717/148 |
| 8,671,414 B1* | 3/2014 | Loafman ................ | G06F 9/544 718/106 |
| 9,038,039 B2* | 5/2015 | Song et al. ................... | 717/148 |
| 9,098,297 B2* | 8/2015 | Poff ....................... | G06F 9/3879 |
| 2002/0019976 A1* | 2/2002 | Patel et al. .................... | 717/137 |
| 2002/0066083 A1* | 5/2002 | Patel ....................... | G06F 8/443 717/136 |
| 2002/0078115 A1* | 6/2002 | Poff et al. ......................... | 709/1 |
| 2003/0061254 A1* | 3/2003 | Lindwer et al. ................ | 709/1 |
| 2003/0084271 A1* | 5/2003 | Lindwer ....................... | 712/209 |
| 2003/0101208 A1* | 5/2003 | Chauvel et al. ................ | 709/1 |
| 2003/0110200 A1* | 6/2003 | Kramskoy ........................ | 709/1 |
| 2004/0015896 A1* | 1/2004 | Dornan et al. ................ | 717/139 |
| 2004/0073904 A1* | 4/2004 | Hill .................................. | 718/1 |
| 2004/0236927 A1* | 11/2004 | Irie et al. ...................... | 712/209 |
| 2005/0044336 A1 | 2/2005 | Shimada et al. | |
| 2005/0240915 A1* | 10/2005 | Patel ............................. | 717/148 |
| 2006/0010440 A1* | 1/2006 | Anderson ............ | G06F 9/45533 718/1 |
| 2006/0101427 A1* | 5/2006 | Yamada et al. ................ | 717/136 |
| 2006/0200801 A1* | 9/2006 | Patel et al. ..................... | 717/118 |
| 2006/0200802 A1* | 9/2006 | Mott ........................ | G06F 9/544 717/120 |
| 2007/0050763 A1* | 3/2007 | Kagan et al. ....................... | 718/1 |
| 2007/0124736 A1* | 5/2007 | Gabor ..................... | G06F 9/461 718/108 |
| 2007/0288912 A1* | 12/2007 | Zimmer et al. ............... | 717/148 |
| 2008/0005297 A1* | 1/2008 | Kjos et al. ..................... | 709/223 |
| 2008/0301652 A1* | 12/2008 | Song ................... | G06F 9/45516 717/148 |
| 2008/0301653 A1* | 12/2008 | Song et al. ................... | 717/148 |
| 2009/0113425 A1* | 4/2009 | Ports et al. ........................ | 718/1 |
| 2010/0050165 A1* | 2/2010 | Chen .................. | G06F 9/45516 717/162 |
| 2010/0077179 A1* | 3/2010 | Stillwell, Jr. ......... | G06F 9/3877 712/30 |
| 2011/0010721 A1* | 1/2011 | Gupta ................... | G06F 9/5077 718/103 |
| 2011/0173155 A1* | 7/2011 | Becchi et al. ................ | 707/610 |
| 2011/0264867 A1* | 10/2011 | Wan .................... | G06F 9/30087 711/147 |
| 2011/0276785 A1* | 11/2011 | Lee ........................ | G06F 9/4552 712/205 |
| 2011/0296440 A1 | 12/2011 | Laurich et al. | |
| 2012/0005678 A1 | 1/2012 | Ge et al. | |
| 2012/0075314 A1 | 3/2012 | Malakapalli et al. | |
| 2012/0260067 A1* | 10/2012 | Henry ................. | G06F 9/30076 712/200 |
| 2012/0266165 A1* | 10/2012 | Cen et al. ......................... | 718/1 |
| 2012/0304159 A1* | 11/2012 | Ceze ........................ | G06F 8/44 717/140 |
| 2013/0132690 A1* | 5/2013 | Epstein ............... | G06F 12/1416 711/159 |
| 2014/0013089 A1* | 1/2014 | Henry ................. | G06F 9/30076 712/226 |
| 2014/0025893 A1* | 1/2014 | Brown ................. | G06F 9/30174 711/125 |
| 2014/0344815 A1* | 11/2014 | Ginzburg ................ | G06F 9/461 718/101 |

OTHER PUBLICATIONS

Ismail, Aws et al. "FUSE: Front-end user framework for O/S abstraction of hardware accelerators." May 2011. Field-Programmable Custom Computing Machines (FCCM), 2011 IEEE 19th Annual International Symposium on. pp. 170-171.*

Nakajo, Hironori et al. "Reconfigurable Android with an FPGA Accelerator for the Future Embedded Devices." Nov. 2011. Networking and Computing (ICNC), 2011 Second International Conference on. pp. 173-178.*

Porthouse, Chris. "High performance Java on embedded devices." 2005. ARM Limited, Oct.*

Vuletid, M.et al. "Seamless hardware-software integration in reconfigurable computing systems." 2005. Design & Test of Computers, IEEE 22.2. pp. 102-113.*

Yan, Lu et al. "An accelerator design for speedup of Java execution in consumer mobile devices." 2009. Computers & Electrical Engineering 35.6. pp. 904-919.*

[English Translation] Office Action for JP201380044841.6 dated Aug. 22, 2017, 5 pages.*

"Dalvik (software)", from Wikipedia, the free encyclopedia, retrieved Dec. 31, 2012 from http://en.wikipedia.org/wiki/Dalvik_(software).

"Efficeon", from Wikipedia, the free encyclopedia, retrieved Dec. 31, 2012 from http://en.wikipedia.org/wiki/Efficeon.

"Jazelle", from Wikipedia, the free encyclopedia, retrieved Dec. 31, 2012 from http://en.wikipedia.org/wiki/Jazelle.

International Search Report and Written Opinion received for PCT Application No. PCT/US2013/062012, dated Dec. 18, 2013, 9 pages.

European Search Report for Application No. 13841895.9-1954/2901266, dated Apr. 28, 2016, 10 pages.

Hu, Shiliang, "Efficient binary translation in co-designed virtual machines," Feb. 28, 2006, Retrieved from http://pages.cs.wisc.edu/'shiliang/doc/Thesis-x86vm.backup.pdf on Apr. 14, 2016, pp. 4-6.

Abhishek, Deb, "HW/SW Mechanisms for Instruction Fusion, Issue and Commit in Modern Microprocessors," May 31, 2012, Retrieved from http://www.tdx.cat/bitstream/handle/10803/81561/TAD1de1.pdf?sequence=1 on Apr. 14, 2016.

Chen, Miaobo et al., "Java JNI Bridge: A Framework for Mixed Native ISA Execution," Fourth International Symposium on Code Generation and Optimization (CGO '06), Jan. 1, 2006, pp. 65-75.

Wang, Cheng, et al., "Acceldroid: Co-designed acceleration of Android bytecode," Code Generation and Optimization (CGO), 2013 IEEE/ACM International Symposium ON, IEEE, Feb. 23, 2013, pp. 1-10.

Wu, Youfeng, "HW/SW co-designed acceleration of dynamic languages," PLDI09: Proceedings of the 2009 ACM Sigplan Conference on Programming Language Design and Implementation, Jun. 15-20, 2009, Dublin, Ireland, Sigplan Notices: A Monthly Publication of the Special Interest Group on Programming Languages of the AS, vol. 48, No. 5, Jun. 20, 2013, pp. 1-2.

Office Action and English Translation for Japanese Patent Application No. 2015-533316, dated May 31, 2016, 10 pages.

Notice of Preliminary Rejection for Korean Patent Application No. 10-2015-7003933, dated Feb. 22, 2016, 5 pages.

Office Action for JP201380044841.6 dated Aug. 22, 2017, 5 pages (in Chinese).

* cited by examiner

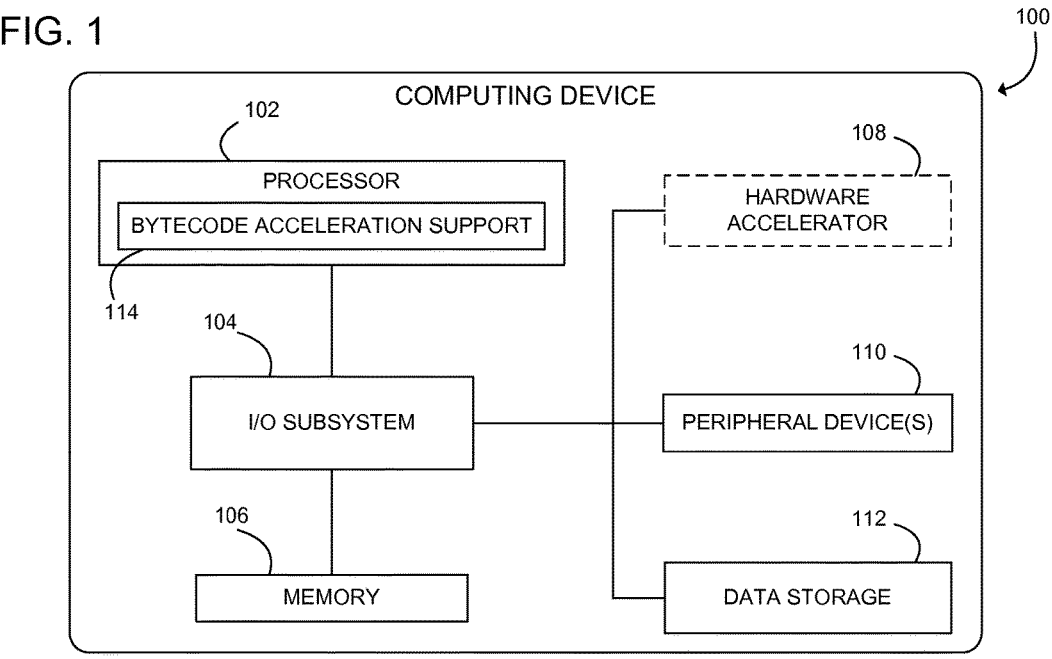
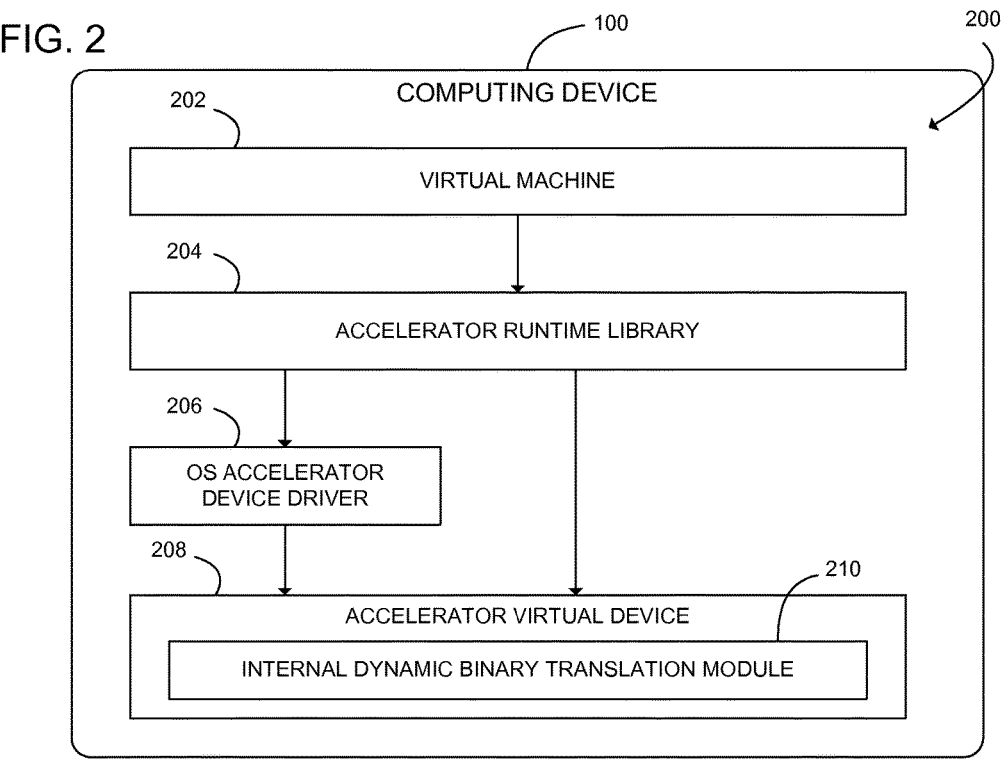

FLEXIBLE ACCELERATION OF CODE EXECUTION

BACKGROUND

Various hardware acceleration designs are used to improve the performance of a computing device while minimizing the power consumption. For example, minimizing power consumption is critical to improving battery life, which is one of the key marketable features of consumer mobile computing devices. Depending on the particular market segment, various system-on-a-chip (SoC) techniques may be implemented to achieve superior performance-per-watt.

However, hardware accelerators have fixed functionality and are relatively expensive and inflexible. Traditional hardware bytecode accelerators are accessed using x86 instruction set architecture (ISA) extensions. Because the x86 ISA is used for acceleration, such hardware accelerators may be inefficient in terms of encoding space, die area, and power consumption.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 1 is a simplified block diagram of at least one embodiment of a computing device for accelerating code execution;

FIG. 2 is a simplified block diagram of at least one embodiment of an environment of the computing device of FIG. 1.

DETAILED DESCRIPTION OF THE DRAWINGS

Figure 3:
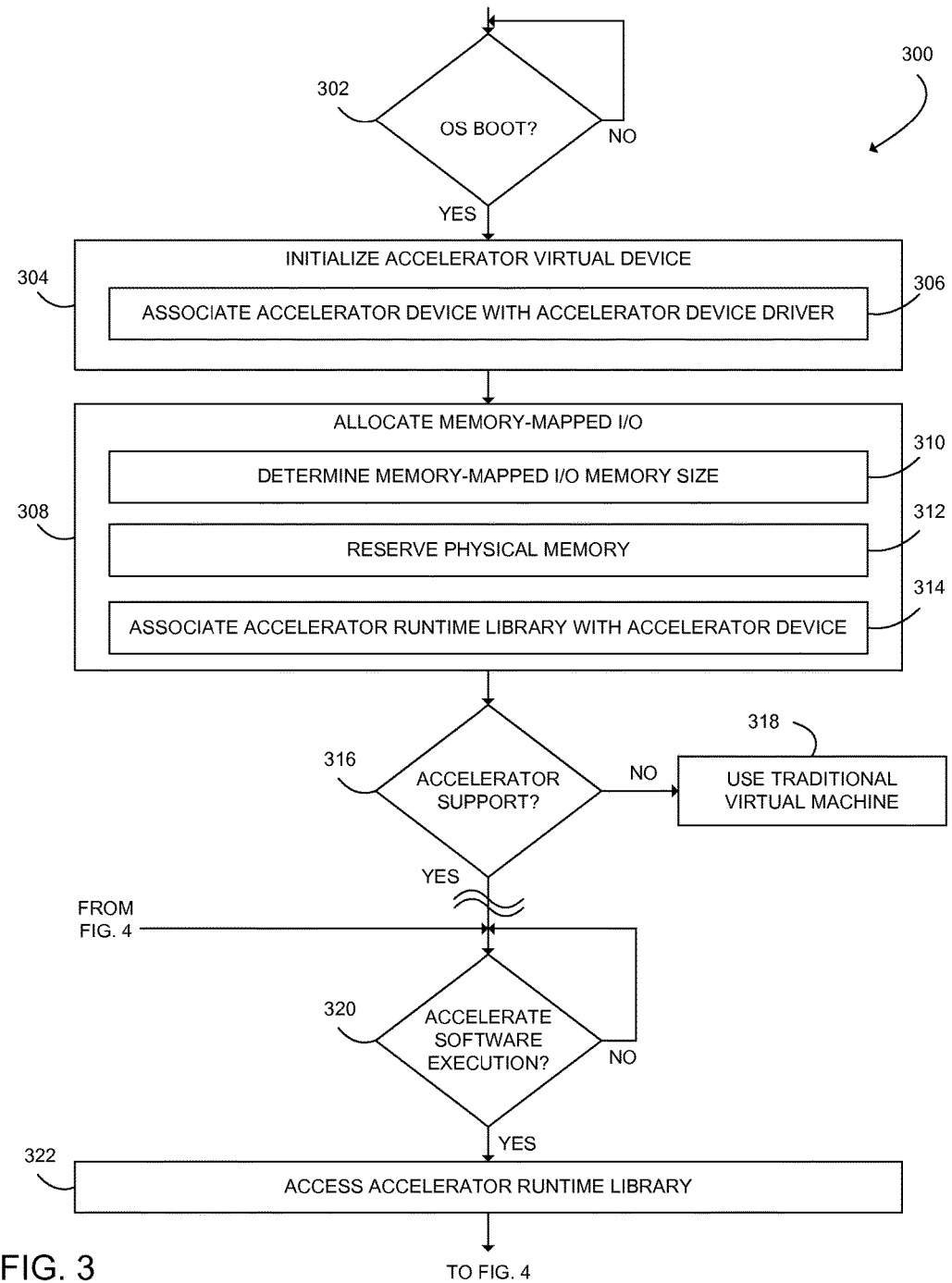
FIGS. 3 and 4 are a simplified flow diagram of at least one embodiment of a method for accelerating code execution on the computing device of FIG. 1.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 may be embodied as any type of computing device capable of accelerating code execution and performing the functions described herein. For example, the computing device 100 may be embodied as a mobile phone, a smart phone, a tablet computing device, a personal digital assistant, a messaging device, a consumer electronic device, a handset, a laptop computer, a desktop computing, and/or any other computing/communication device. As shown in FIG. 1, the illustrative computing device 100 includes a processor 102, an input/output (I/O) subsystem 104, a memory 106, a hardware accelerator 108, one or more peripheral devices 110, and data storage 112. Of course, the computing device 100 may include other or additional components, such as those commonly found in a computing device (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the computing device 100 such as operating systems, applications, programs, libraries, and drivers. The memory 106 is communicatively coupled to the processor 102 via the I/O subsystem 104, which may be embodied as circuitry and/or components to facilitate input/output operations with the processor 102, the memory 106, and other components of the computing device 100. For example, the I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a SoC and be incorporated, along with the processor 102, the memory 106, and other components of the computing device 100, on a single integrated circuit chip. Further, in some embodiments, the processor 102 includes bytecode acceleration support 114 to accelerate code execution. The bytecode acceleration support 114 may be embodied as any type of component or circuitry capable of accelerating the execution of one or more instructions or bytecode executing on the processor 102 and capable of performing the functions described herein.

The hardware accelerator 108 may be embodied as any type of hardware device or component capable of accelerating the execution of one or more instructions or bytecode associated with a software application and capable of performing the functions described herein. For example, the hardware accelerator 108 may be embodied as, or otherwise include, a graphics accelerator, a floating-point accelerator, or other hardware accelerator device. As discussed below, in some embodiments, the hardware accelerator 108 may be configured to accelerate code that is not dependent on an operating system (OS) of the computing device 100. In some embodiments, the hardware accelerator 108 may form a portion of a SoC along with one or more other components of the computing device 100.

The peripheral devices 110 of the computing device 100 may include any number of peripheral or interface devices or components. For example, the peripheral device 110 may include communication circuitry to communicate with remote devices. The particular devices included in the peripheral devices 110 may depend on, for example, the intended use of the computing device 100. The data storage 112 may be embodied as any type of device or devices configured for short-term or long-term storage of data such as, for example, memory devices and circuits, memory cards, hard disk drives, solid-state drives, or other data storage devices.

As shown in FIG. 2, the computing device 100 may establish an environment 200 for accelerating code. The environment 200 in the illustrative embodiment includes a virtual machine 202, an accelerator runtime library 204, an OS accelerator device driver 206, an accelerator virtual device 208, and an internal dynamic binary translation module 210.

The virtual machine 202 may probe the computing device 100 to determine whether the accelerator virtual device 208 is supported by the computing device 100 using, for example, the existing I/O interface of the computing device 100. The accelerator runtime library 204 may implement an application programming interface (API) of the accelerator virtual device 208. In doing so, the accelerator runtime library 204 may permit the accelerator virtual device 208 to be accessed through the OS accelerator device driver 206 and through memory-mapped I/O. As discussed below, in some embodiments, the OS accelerator device driver 206 is used only to initialize the accelerator virtual device 208. Thereafter, the accelerator virtual device 208 may be accessed via memory-mapped I/O to trigger code acceleration. The OS accelerator device driver 206 may be used to initialize the accelerator virtual device 208 using, for example, standard operating system I/O instructions. The accelerator virtual device 208 may include the internal dynamic binary translation module 210, which may be used to accelerate code execution. In some embodiments, the internal dynamic binary translation module 210 virtualizes the accelerator virtual device 208 by transparently translating non-ISA codes (e.g., Dalvik bytecode, JavaScript, HTML5, etc.) into internal ISA code using the hardware accelerator 108 and/or the bytecode acceleration support 114. In some embodiments, including the illustrative embodiment, the internal dynamic binary translation module 210 is internal to the processor 102 and transparent to external software, including the operating system of the computing device 100. As such, external software may recognize the accelerator virtual device 208 but not the internal dynamic binary translation module 210. Further, in some embodiments, the internal dynamic binary translation module 210 can utilize various hardware accelerator supports in the internal ISA to translate code from different languages transparently.

Figure 4:
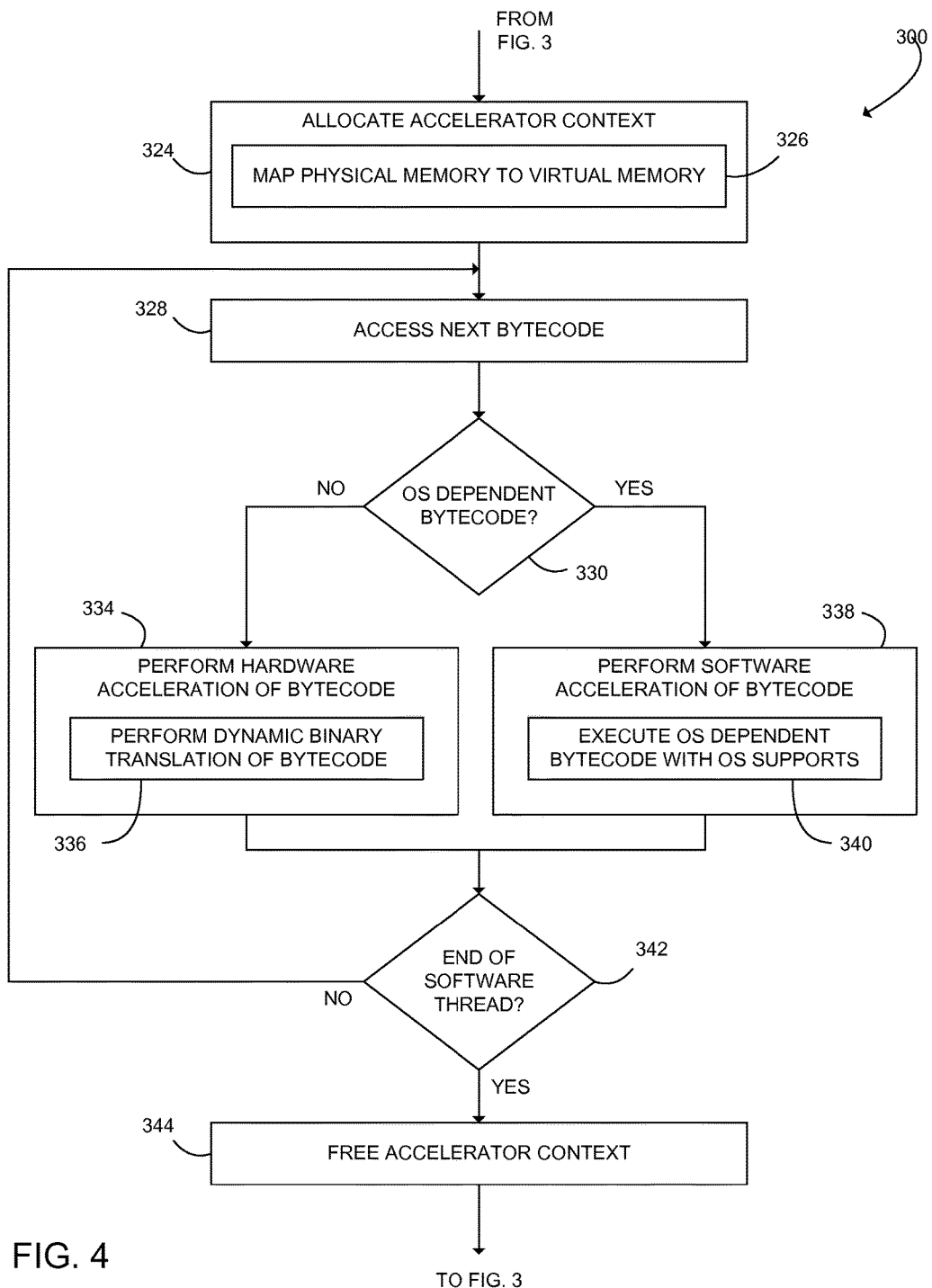

Referring now to FIGS. 3 and 4, an illustrative embodiment of a method 300 for accelerating code execution, which may be executed by the computing device 100, begins with block 302 of FIG. 3. In block 302, the computing device 100 determines whether the operating system is booted. Upon boot of the operating system, the computing device 100 initializes the accelerator virtual device 208 in block 304. In doing so, in block 306, the computing device 100 may associate the accelerator virtual device 208 with the OS accelerator device driver 206. In some embodiments, the accelerator virtual device 208 may be implemented as a virtual Peripheral Component Interconnect (PCI) device. In such embodiments, the computing device 100 may probe each of the PCI devices to determine whether the accelerator virtual device 208 exists and is supported by the computing device 100.

In block 308, the computing device 100 allocates memory-mapped I/O for the accelerator virtual device 208. In doing so, the computing device 100 determines the size of the memory to be reserved for the memory-mapped I/O in block 310. For example, the accelerator virtual device 208 may reserve one page of memory for memory-mapped I/O. In block 312, the computing device 100 reserves physical memory in the memory 106 to accommodate the memory-mapped I/O. In some embodiments, each reserved physical memory address represents an accelerator or thread context for acceleration. In block 314, the computing device 100 may associate the accelerator runtime library 204 with the accelerator virtual device 208. In some embodiments, the accelerator virtual device 208 is initialized and/or the memory-mapped I/O is allocated via the OS accelerator device driver 206.

In block 316, the computing device 100 determines whether it supports the accelerator virtual device 208. If the accelerator virtual device 208 is not supported, then the computing device 100 uses a traditional virtual machine to run the code. For example, in some embodiments, the traditional virtual machine may execute one bytecode at a time with operating system supports or execute corresponding just-in-time (JIT) code in the virtual machine context. If the accelerator virtual device 208 is supported, however, the method 300 advances to block 320. It should be appreciated that in some embodiments, the computing device 100 may determine that the accelerator virtual device 208 is not supported at other stages in method 300 such as, for example, block 304. In some embodiments, at any point in which the computing device 100 determines that the accelerator virtual device 208 is not supported, the method 300 advances directly to block 318 in which the computing device 100 uses a traditional virtual machine for code execution.

In block 320, the computing device 100 determines whether to accelerate software execution. For example, in some embodiments, the computing device 100 determines when a new software application or other code is executed for which code acceleration is desired. In some embodiments, the acceleration of bytecode runs atomically at the x86 architecture level with no intermediate state visible. It should be appreciated that, in some embodiments, multiple codes or threads may be accelerated simultaneously (e.g., in parallel) using the method 300. If the computing device 100 determines that there is software or other code to be accelerated, the computing device 100 accesses or opens the accelerator runtime library 204 in block 322. In some embodiments, if the computing device 100 is unable to access the accelerator runtime library 204, the method 300 returns to block 318 in which the computing device 100 uses a traditional virtual machine for code execution.

Referring now to FIG. 4, in block 324, the computing device 100 allocates a context (e.g., a thread context) for the accelerator virtual device 208. The bytecode associated with each instance of a software application is typically, although not necessarily, run on a single thread. As such, in allocating a context for the accelerator virtual device 208, the computing device 100 may determine which thread the software to be accelerated is running on. Further, in block 326, the computing device 100 maps the physical memory 106 reserved for memory-mapped I/O (see block 312) to the virtual memory associated with the software application to be accelerated. Mapping the physical memory to the virtual memory permits the virtual machine 202 to directly branch to the memory-mapped I/O address to trigger acceleration without "trapping" the operating system.

The computing device 100 may accelerate the execution of the code for a particular thread using, for example, the method 300 as described in blocks 328 to 342. In block 328, the computing device 100 may access the next bytecode or instruction on a thread. The computing device 100 may then determine in block 330 whether the accessed bytecode is OS dependent. That is, the computing device 100 determines whether OS supports are required to execute the bytecode. In some embodiments, for example, OS dependent bytecode includes bytecode directed to operations such as I/O operations. However, OS independent bytecode includes bytecode to perform, for example, simple mathematical calculations, such as those performed by an Arithmetic Logic Unit (ALU). If the computing device 100 determines that the bytecode is not OS dependent, then the computing device 100 performs hardware acceleration of the bytecode in block 334 using the hardware accelerator 108 and/or the bytecode acceleration support 114. In doing so, in block 336, the computing device 100 performs dynamic binary translation of the bytecode using the internal dynamic binary translation module 210 of the accelerator virtual device 208.

In some embodiments, the internal dynamic binary translation module 210 may use the memory-mapped I/O as a memory fault trap to catch, for example, read and write operations to the memory-mapped I/O space associated with the accelerator virtual device 208. As such, the internal dynamic binary translation module 210 can distinguish between x86 instructions to read or write memory within the memory-mapped I/O space (i.e., those to be accelerated) and the x86 instructions to read or write memory within the normal memory space (i.e., those not to be accelerated). This saves the expense of forcing the internal dynamic binary translation module 210 to intercept all read and write operations, some of which include OS dependent bytecode; only those operations directed to the memory-mapped I/O space are hardware accelerated. The internal dynamic binary translation module 210 may intercept calls to memory-mapped I/O space and accelerate the code using the hardware accelerator 108 and/or the bytecode acceleration support 114. In some embodiments, the memory-mapped I/O space simply contains return commands, such that after the code is accelerated and the internal dynamic binary translation module 210 returns the code to the called address within the memory-mapped I/O space, the code can be further returned to the point in code from which it was called.

If the computing device 100 determines that the bytecode is OS dependent, then the computing device 100 performs software acceleration of the bytecode using any suitable software acceleration mechanism in block 338. In some embodiments, in block 340, the computing device 100 executes the OS dependent bytecode with OS supports and accelerates the code to the extent possible without using the hardware accelerator 108 or the bytecode acceleration support 114. In some embodiments, the OS dependent bytecode is handled using the virtual machine 202. In such embodiments, the accelerator virtual device 208 provides support for returning from the accelerator virtual device 208 to the virtual machine 202 to handle those bytecodes.

After the computing device 100 accelerates the bytecode accessed in block 328 (i.e., using the hardware acceleration of block 334 or software acceleration of block 338), the computing device 100 determines whether the end of the software thread has been reached in block 342. If not, the method 300 returns to block 328 in which the computing device 100 accessed the next bytecode of the thread. However, if the end of the thread has been reached, the computing device 100 frees the accelerator virtual device context in block 344. In some embodiments, the computing device 100 unmaps or disassociates the accelerator virtual device context from the virtual memory of the software. The method 300 then returns to block 320 in which the computing device 100 determines whether to accelerate the execution of another software. As discussed above, in some embodiments, multiple threads may be accelerated in parallel and/or series. In some embodiments, one or more OS independent bytecodes that are not performance critical may be executed similar to OS dependent bytecodes rather than using memory-mapped I/O.

In an embodiment, the accelerator virtual device 208 may be embodied as a co-designed flexible accelerator (CDFA) device used to accelerate, for example, Dalvik bytecode. The pseudocode in Table 1 shows one embodiment of an implementation of the virtual machine 202 leveraging CDFA support.

TABLE 1

Example Virtual Machine Leveraging CDFA

```
VM_thread_run( )
{
   if(cdfa_handler = CDFA_open(DALVIK, ... ))    // use dalvik VM
   for example
   {
      cdfa_context = CDFA_alloc_context(cdfa_handler, VM_context)
      while(not end of thread)
      {
         CDFA_run(cdfa_context);
         interpret OS dependent bytecode or run
         corresponding JITed code in VM_context
      }
      CDFA_free_context(cdfa_handler, cdfa_context);
      CDFA_close(cdfa_handler);
   }
   else     // no CDFA support while(not end of thread)
   {
      interpret one bytecode or run corresponding JITed code in
      VM_context
   }
}
```

The pseudocode in Table 2 shows an example implementation for the CDFA runtime (e.g., the accelerator runtime library 204).

TABLE 2

Example Implementation for CDFA Runtime

```
CDFA_open(cdfa_id)
{
    if(cdfa_id == DALVIK)
        return open("/dev/dalvik"); // standard OS API
    return NULL;
}
CDFA_alloc_context(handler, VM_context) \
{
```

TABLE 2-continued

Example Implementation for CDFA Runtime

```
    return ioctl(handler, ALLOC_CONTEXT, VM_context);
    // standard OS API
    // allocate a CDFA context and return the memory mapped
    // I/O address for the context
}
CDFA_run (CDFA_context)
{
    (*CDFA_context)( );
    // CDFA device interface to trigger bytecode acceleration
    // through the call to memory mapped I/O address.
    // The memory mapped I/O contains only an X86 RET
    // instruction to return to the caller.
    // DBT intercepts the fetch of the X86 RET in memory
    // mapped I/O to accelerate bytecode execution.
}
```

TABLE 2-continued

Example Implementation for CDFA Runtime

```
CDFA_free_context(handler, CDFA_context)
{
    return ioctl(handler, FREE_CONTEXT, CDFA_context);
    // standard OS API
    // free a CDFA context
}
CDFA_close(handler)
{
    close(handler); // standard OS API
}
```

The pseudocode in Table 3 shows an example CDFA device driver (e.g., the OS accelerator device driver 206) modeled as a virtual PCI device for accelerating Dalvik bytecode.

TABLE 3

Example CDFA Device Driver

```
// use PCI device driver emboidment
OS_PCI_probe_device( )  // standard OS code run at OS boot time
{
    probe all PCI device id   // standard PCI interface through I/O Instruction
    {
        if (the probed device id match CDFA DALVIK device id)
            PCI_CDFA_DALVIK_init( )
        . . .
    }
}
PCI_CDFA_DALVIK_init( )
{ // CDFA DALVIK device initialization
    IO_mem_size = query memory mapped I/O size   // standard PCI interface
                                                  // through I/O Instruction
    IO_mem_addr = reserve physical memory address space of IO_mem_size for
            memory mapped I/O          // standard OS code
    set I/O mapped memory at IO_mem_addr   // standard PCI interface
                                            // through I/O Instruction
create "/dev/dalvik" associated with the device for open // standard OS code
}
PCI_CDFA_DALVIK_ioctl(ctl_id, context, . . . )
{ // called from ioctl for CDFA DALVIK device
    if(ctl_id == ALLOC_CONTEXT)
    {
        allocate a new CDFA_context and configure it with VM context
            // CDFA PCI interface through I/O Instruction
        map CDFA_context to process virtual memory and return it;
            // standard OS code
    }
    if(ctl_id == FREE_CONTEXT)
    {
        unmap context from process virtual memory; // standard OS code
        free the CDFA context // CDFA PCI interface through I/O Instruction
    }
    . . .
}
```

The pseudocode in Table 4 shows an example for implementing a virtual PCI CDFA device using the internal dynamic binary translation module 210.

TABLE 4

Example of Implementing a Virtual PCI CDFA device

```
Virtualize X86 I/O instruction execution:
    // device interface through I/O instruction
case probe DALVIK device:
    return CDFA_DALVIK // return device id
case query DALVIK device I/O memory size:
    return pagesize; // need 1 page of memory mapped I/O
case set DALVIK device I/O mapped memory at IO_mem_addr:
    Dalvik_IO_base = IO_mem_addr; // set reserved I/O address
case allocate CDFA context with VM_context:
    configure CDFA with VM_context and get a new context_id
```

TABLE 4-continued

Example of Implementing a Virtual PCI CDFA device

```
   return Dalvik_IO_base + context_id; // return context in I/O address
case free CDFA_context:
   context_id = CDFA_context -Dalvik_IO_base
   free context_id;
After branch to an instruction at address EIP:
      // device interface via memory mapped I/O
   map viritual EIP to physical PIP;
   if (PIP > Dalvik_IO_base && PIP < =Dalvik_IO_base + pagesize )
   {
      context_id = PIP - Dalvik_IO_base; // get context_id
      CDFA_Dalvik_VM(context_id); // bytecode execution with
      context_id
      return an X86 RET instruction as the fetched instruction
   }
```

Of course, it should be appreciated that the Tables 1-4 discussed above, and the pseudocode therein, are directed to specific implementations and provided for illustration. The concepts discussed herein are not so limited and other implementations of the disclosure concepts may be created having pseudocode different from that discussed above.

EXAMPLES

Illustrative examples of the devices, systems, and methods disclosed herein are provided below. An embodiment of the devices, systems, and methods may include any one or more, and any combination of, the examples described below.

Example 1 includes a computing device for performing flexible code acceleration. The computing device includes a physical memory having stored therein a plurality of instructions; a processor to execute the plurality of instructions to establish an accelerator virtual device, an accelerator virtual device operating system driver, and a virtual machine, wherein the virtual machine is to, using the accelerator virtual device operating system driver, (i) initialize the accelerator virtual device to facilitate the acceleration of a software code and (ii) allocate a portion of the physical memory as memory-mapped input/output for accessing the accelerator virtual device; and the accelerator virtual device is to determine whether a bytecode of a software code to be accelerated is an operating system-dependent bytecode.

Example 2 includes the subject matter of Example 1, and wherein the virtual machine is to allocate the memory-mapped input/output by (i) determining a size of memory to be reserved for the memory-mapped input/output and (ii) reserving a portion of the physical memory for memory-mapped input/output, the portion corresponding in size with the determined size of memory to be reserved.

Example 3 includes the subject matter of any of Examples 1 and 2, and wherein the virtual machine is further to allocate an accelerator virtual device context for the software code to be accelerated.

Example 4 includes the subject matter of any of Examples 1-3, and wherein the virtual machine is further to allocate the accelerator virtual device context by mapping the reserved physical memory to virtual memory associated with an instance of the software code to be accelerated.

Example 5 includes the subject matter of any of Examples 1-4, and wherein each address of the reserved physical memory is associated with a different accelerator virtual device context.

Example 6 includes the subject matter of any of Examples 1-5, and wherein the virtual machine is to allocate the accelerator virtual device context by determining on which thread the software code instance is to be executed.

Example 7 includes the subject matter of any of Examples 1-6, and wherein the virtual machine is further to free the allocated accelerator virtual device context by unmapping the accelerator virtual device from the virtual memory in response to identifying an end of the thread.

Example 8 includes the subject matter of any of Examples 1-7, and wherein the accelerator virtual device is to perform hardware acceleration of the bytecode using the memory-mapped input/output in response to determining the bytecode is not an operating system-dependent bytecode.

Example 9 includes the subject matter of any of Examples 1-8, and wherein the virtual machine is to directly branch to an address within the reserved physical memory to trigger the hardware acceleration via the memory-mapped input/output.

Example 10 includes the subject matter of any of Examples 1-9, and further including an internal dynamic binary translation module to intercept read and write calls to the reserved physical memory and perform the hardware acceleration, wherein each address within the reserved physical memory stores only a return instruction.

Example 11 includes the subject matter of any of Examples 1-10, and wherein the virtual machine is to initialize the accelerator virtual device by associating the accelerator virtual device with the accelerator virtual device operating system driver.

Example 12 includes the subject matter of any of Examples 1-11, and wherein the accelerator virtual device comprises an internal dynamic binary translation module to perform the hardware acceleration of the bytecode.

Example 13 includes the subject matter of any of Examples 1-12, and wherein the processor comprises the internal dynamic binary translation module.

Example 14 includes the subject matter of any of Examples 1-13, and wherein the virtual machine is further to perform software acceleration of the bytecode in response to determining the bytecode is operating system-dependent bytecode.

Example 15 includes the subject matter of any of Examples 1-14, and wherein the processor is to execute the operating system-dependent bytecode using operating system supports.

Example 16 includes the subject matter of any of Examples 1-15, and wherein the processor comprises a bytecode acceleration support to execute the hardware acceleration of the bytecode.

Example 17 includes the subject matter of any of Examples 1-16, and further including a hardware accelerator to execute the hardware acceleration of the bytecode.

Example 18 includes a method for performing flexible code acceleration on a computing device. The method includes initializing, on the computing device, an accelerator virtual device to facilitate the acceleration of a software code; allocating a portion of a memory of the computing device as memory-mapped input/output for accessing the accelerator virtual device; and determining, on the computing device, whether a bytecode of the software code to be accelerated is an operating system-dependent bytecode.

Example 19 includes the subject matter of Example 18, and wherein allocating the memory-mapped input/output comprises associating the accelerator virtual device with an accelerator virtual device runtime library.

Example 20 includes the subject matter of any of Examples 18 and 19, and wherein allocating the memory-mapped input/output comprises determining, on the computing device, a size of memory to be reserved for the memory-mapped input/output; and reserving, on the computing device, a portion of physical memory of the computing device corresponding in size with the determined size of memory to be reserved.

Example 21 includes the subject matter of any of Examples 18-20, and further including allocating, on the computing device, an accelerator virtual device context for the software code to be accelerated.

Example 22 includes the subject matter of any of Examples 18-21, and wherein allocating the accelerator virtual device context comprises mapping the physical memory to virtual memory associated with an instance of the software code to be executed.

Example 23 includes the subject matter of any of Examples 18-22, and wherein allocating the accelerator virtual device context comprises reserving each address of the physical memory for a different accelerator virtual device context.

Example 24 includes the subject matter of any of Examples 18-23, and further including performing hardware acceleration of the bytecode using the memory-mapped input/output in response to determining the bytecode is not an operating system-dependent bytecode.

Example 25 includes the subject matter of any of Examples 18-24, and wherein performing the hardware acceleration of the bytecode comprises directly branching to the memory-mapped input/output address to trigger the hardware acceleration.

Example 26 includes the subject matter of any of Examples 18-25, and wherein allocating the accelerator virtual device context comprises determining on which thread the software code instance is to be accelerated.

Example 27 includes the subject matter of any of Examples 18-26, and further including freeing the allocated accelerator virtual device context by unmapping the accelerator virtual device from the virtual memory in response to identifying an end of the thread.

Example 28 includes the subject matter of any of Examples 18-27, and wherein initializing the accelerator virtual device comprises associating the accelerator virtual device with an operating system driver of the accelerator virtual device.

Example 29 includes the subject matter of any of Examples 18-28, and wherein initializing the accelerator virtual device comprises initializing the accelerator virtual device as a virtual Peripheral Component Interconnect device.

Example 30 includes the subject matter of any of Examples 18-29, and wherein performing hardware acceleration of the bytecode comprises performing dynamic binary translation of the bytecode.

Example 31 includes the subject matter of any of Examples 18-30, and further including determining, on the computing device, whether the accelerator virtual device is supported by the computing device; and executing the bytecode on a virtual machine of the computing device in response to determining that the accelerator virtual device is not supported by the computing device.

Example 32 includes the subject matter of any of Examples 18-31, and further including performing, on the computing device, software acceleration of the bytecode in response to determining the bytecode is an operating system-dependent bytecode.

Example 33 includes the subject matter of any of Examples 18-32, and wherein performing the software acceleration of the bytecode comprises executing the operating system-dependent bytecode using operating system supports.

Example 34 includes a computing device includes a processor and a memory having stored therein a plurality of instructions that when executed by the processor cause the computing device to perform the method of any of Examples 18-33.

Example 35 includes one or more machine readable storage media comprising a plurality of instructions stored thereon that in response to being executed result in a computing device performing the method of any of Examples 18-33.

The invention claimed is:

1. A computing device for performing flexible code acceleration, the computing device comprising:
 a physical memory having stored therein a plurality of instructions;
 a processor to execute the plurality of instructions to establish an accelerator virtual device, an accelerator virtual device operating system driver, and a virtual machine, wherein:
 the virtual machine is to, using the accelerator virtual device operating system driver, (i) initialize the accelerator virtual device to facilitate the acceleration of a software code, (ii) reserve a portion of the physical memory as memory-mapped input/output for accessing the accelerator virtual device, (iii) determine whether to accelerate a software code, (iv) access an accelerator runtime library in response to a determination to accelerate the software code, and (v) allocate an accelerator virtual device context associated with a thread of the software code to be accelerated; and
 the accelerator virtual device is to (i) access a bytecode from the thread of the software code in response to allocation of the accelerator virtual device context, (ii) determine whether the bytecode of the software code to be accelerated is an operating system-dependent bytecode, wherein an operating system-dependent bytecode requires operating system support to execute, (iii) utilize, by an internal dynamic binary translation module, the reserved portion of the physical memory as a memory fault trap to intercept, read and write calls of bytecode to be accelerated through translation of the bytecode from one or more non-instruction set architecture codes into one or more instruction set architecture codes of the computing device, and (iv) perform hardware acceleration of the bytecode atomically, with no intermediate state associated with the bytecode visible to software executed by the processor, in response to a determination that the bytecode is not an operating system-dependent bytecode, wherein the bytecode does not require operating system support to execute, and in response to interception of the read and write calls with the memory fault trap;
 wherein the processor is to perform software acceleration of the bytecode in response to a determination that the bytecode is an operating system-dependent bytecode.

2. The computing device of claim 1, wherein the virtual machine is further to (i) determine whether an end of the thread of the software code to be accelerated has been reached and (ii) free the accelerator virtual device context in response to a determination that the end of the thread has been reached, wherein to free the accelerator virtual device context comprises to unmap the accelerator virtual device context from virtual memory associated with an instance of the software code to be accelerated.

3. The computing device of claim 2, wherein to allocate the accelerator virtual device context further comprises to map the reserved physical memory to the virtual memory associated with the instance of the software code to be accelerated.

4. The computing device of claim 3, wherein the accelerator virtual device is to perform the hardware acceleration of the bytecode using the memory-mapped input/output.

5. The computing device of claim 4, wherein the virtual machine is to directly branch to an address within the reserved physical memory to trigger the hardware acceleration via the memory-mapped input/output.

6. The computing device of claim 5, wherein each address within the reserved physical memory stores only a return instruction.

7. The computing device of claim 1, wherein to initialize the accelerator virtual device comprises to associate the accelerator virtual device with the accelerator virtual device operating system driver.

8. The computing device of claim 1, wherein the accelerator virtual device comprises the internal dynamic binary translation module.

9. The computing device of claim 8, wherein the processor comprises the internal dynamic binary translation module.

10. The computing device of claim 1, further comprising a hardware accelerator to execute the hardware acceleration of the bytecode.

11. The computing device of claim 1, wherein the virtual machine is further to:
reserve multiple physical memory addresses for the memory mapped input/output to the accelerator virtual device, wherein each of the physical memory addresses corresponds to a different thread context for acceleration.

12. A method for performing flexible code acceleration on a computing device, the method comprising:
initializing, by the computing device, an accelerator virtual device to facilitate the acceleration of a software code;
reserving, by the computing device, a portion of a memory of the computing device as memory-mapped input/output for accessing the accelerator virtual device;
determining, by the computing device, whether to accelerate a software code;
accessing, by the computing device, an accelerator runtime library in response to determining to accelerate the software code;
allocating, by the computing device, an accelerator virtual device context associated with a thread of the software code to be accelerated;
accessing, by the computing device, a bytecode from the thread of the software code in response to allocating the accelerator virtual device context;
determining, by the computing device, whether the bytecode of the software code to be accelerated is an operating system-dependent bytecode, wherein an operating system-dependent bytecode requires operating system support to execute;
utilizing, by the computing device, the reserved portion of the physical memory as a memory fault trap to intercept read and write calls of bytecode to be accelerated through translation of the bytecode from one or more non-instruction set architecture codes into one or more instruction set architecture codes of the computing device;
performing, by an internal dynamic binary translation module of the computing device and in response to determining that the bytecode is not an operating system-dependent bytecode, hardware acceleration of the bytecode by intercepting read and write calls to the reserved portion of the memory and performing the translation to the one or more instruction set architecture codes, wherein the bytecode does not require operating system support to execute and wherein the hardware acceleration of the bytecode is performed atomically, with no intermediate state associated with the bytecode visible to software executed by the computing device; and
performing, by the computing device, software acceleration of the bytecode in response to determining that the bytecode is an operating system-dependent bytecode.

13. The method of claim 12, further comprising:
determining, by the computing device, whether an end of the thread of the software code to be accelerated has been reached; and
freeing, by the computing device, the accelerator virtual device context in response to determining that the end of the thread has been reached, wherein freeing the accelerator virtual device context comprises unmapping the accelerator virtual device context from virtual memory associated with an instance of the software code to be accelerated.

14. The method of claim 12, wherein reserving the portion of the memory for the memory-mapped input/output comprises:
determining, on the computing device, a size of memory to be reserved for the memory-mapped input/output; and
reserving, on the computing device, a portion of physical memory of the computing device corresponding in size with the determined size of memory to be reserved.

15. The method of claim 14, wherein allocating the accelerator virtual device context comprises mapping the physical memory to virtual memory associated with an instance of the software code to be executed.

16. The method of claim 15, wherein allocating the accelerator virtual device context comprises reserving each address of the physical memory for a different accelerator virtual device context.

17. The method of claim 15, wherein performing the hardware acceleration of the bytecode comprises performing hardware acceleration of the bytecode using the memory-mapped input/output.

18. The method of claim 17, wherein performing the hardware acceleration of the bytecode comprises directly branching to the memory-mapped input/output address to trigger the hardware acceleration.

19. The method of claim 12, further comprising:
determining, on the computing device, whether the accelerator virtual device is supported by the computing device; and
executing the bytecode on a virtual machine of the computing device in response to determining that the accelerator virtual device is not supported by the computing device,
wherein determining whether the bytecode is an operating system-dependent bytecode comprises determining whether the bytecode is an operating system-dependent bytecode in response to determining that the accelerator virtual device is supported by the computing device.

20. One or more non-transitory machine readable storage media comprising a plurality of instructions stored thereon that, in response to being executed, result in a computing device:
  initializing an accelerator virtual device to facilitate the acceleration of a software code;
  reserving a portion of a memory of the computing device as memory-mapped input/output for accessing the accelerator virtual device;
  determining whether to accelerate a software code;
  accessing an accelerator runtime library in response to determining to accelerate the software code;
  allocating an accelerator virtual device context associated with a thread of the software code to be accelerated;
  accessing a bytecode from the thread of the software code in response to allocating the accelerator virtual device context;
  determining whether the bytecode of the software code to be accelerated is an operating system-dependent bytecode, wherein an operating system-dependent bytecode requires operating system support to execute;
  utilizing the reserved portion of the physical memory as a memory fault trap to intercept read and write calls of bytecode to be accelerated through translation of the bytecode from one or more non-instruction set architecture codes into one or more instruction set architecture codes of the computing device;
  performing, by an internal dynamic binary translation module of the computing device and in response to determining that the bytecode is not an operating system-dependent bytecode, hardware acceleration of the bytecode by intercepting read and write calls to the reserved portion of the memory and performing the translation to the one or more instruction set architecture codes, wherein the bytecode does not require operating system support to execute and wherein the hardware acceleration of the bytecode is performed atomically, with no intermediate state associated with the bytecode visible to software executed by the computing device; and
  performing software acceleration of the bytecode in response to determining that the bytecode is an operating system-dependent bytecode.

21. The one or more non-transitory machine readable storage media of claim 20, wherein the accelerator virtual device context comprises mapping the physical memory to virtual memory associated with an instance of the software code to be executed.

22. The one or more non-transitory machine readable storage media of claim 21, wherein allocating the accelerator virtual device context comprises reserving each address of the physical memory for a different accelerator virtual device context.

23. The one or more non-transitory machine readable storage media of claim 21, wherein performing the hardware acceleration of the bytecode comprises performing hardware acceleration of the bytecode using the memory-mapped input/output.

24. The one or more non-transitory machine readable storage media of claim 23, wherein performing the hardware acceleration of the bytecode comprises directly branching to the memory-mapped input/output address to trigger the hardware acceleration.

25. The one or more non-transitory machine readable storage media of claim 24, wherein allocating the accelerator virtual device context comprises determining on which thread the software code instance is to be accelerated.

* * * * *